United States Patent
Williams et al.

(10) Patent No.: US 8,139,336 B2
(45) Date of Patent: Mar. 20, 2012

(54) FIELD CONFIGURABLE RATING PLUG USING COMMUNICATION AND CONTROL SIGNAL

(75) Inventors: Craig Benjamin Williams, Louisville, KY (US); Mark Fredrick Culler, Prospect, KY (US); Seshagiri Rao Komaravolu, Andhra Pradesh (IN); Remesh Kumar Keeramthode, Andhra Pradesh (IN)

(73) Assignee: General Electric Company, Schenectady, NY (US)

( * ) Notice: Subject to any disclaimer, the term of this patent is extended or adjusted under 35 U.S.C. 154(b) by 562 days.

(21) Appl. No.: 12/343,724

(22) Filed: Dec. 24, 2008

(65) Prior Publication Data
US 2010/0157497 A1   Jun. 24, 2010

(51) Int. Cl.
*H02H 3/08* (2006.01)

(52) U.S. Cl. ...................................................... 361/93.3

(58) Field of Classification Search ............. 361/93.3, 361/91.1, 93.2, 115; 700/292
See application file for complete search history.

(56) References Cited

U.S. PATENT DOCUMENTS

| 7,430,482 | B2 * | 9/2008 | Butland et al. ................... 702/66 |
| 2007/0139845 | A1 * | 6/2007 | Butland et al. ................ 361/115 |
| 2008/0158762 | A1 * | 7/2008 | Lenhart et al. ............... 361/93.2 |
| 2009/0122453 | A1 * | 5/2009 | Vicente et al. ................ 361/93.3 |
| 2009/0257163 | A1 * | 10/2009 | Vicente et al. ............... 361/91.1 |
| 2010/0067159 | A1 * | 3/2010 | Topucharla et al. .......... 361/93.2 |

FOREIGN PATENT DOCUMENTS
EP   1189324 A2 *   3/2002

* cited by examiner

*Primary Examiner* — Rexford Barnie
*Assistant Examiner* — Angela Brooks
(74) *Attorney, Agent, or Firm* — Cantor Colburn LLP

(57) ABSTRACT

A circuit breaker apparatus is provided and includes a trip mechanism which is coupled to an electrical circuit and which is configured to interrupt an operation of the electrical circuit when the trip mechanism is actuated, an electronic trip unit in signal communication with and configured to actuate the trip mechanism when pre-selected conditions are satisfied, and a rating plug coupled to the electronic trip unit and configured to operate in a first mode in response to a receipt of a transmitted control signal at the rating plug, and to otherwise operate in a second mode, the first and second modes being respectively associated with first and second ones of the pre-selected conditions to be correspondingly transmitted to the electronic trip unit by which the electronic trip unit determines whether to actuate the trip mechanism.

14 Claims, 2 Drawing Sheets

FIELD CONFIGURABLE RATING PLUG USING COMMUNICATION AND CONTROL SIGNAL

BACKGROUND

Aspects of the present invention are directed to a circuit breaker apparatus and, more particularly, to a circuit breaker apparatus having a field configurable rating plug installed therein.

A circuit breaker apparatus may be employed in various commercial, residential and industrial applications to interrupt current and/or voltage in circuits to which they are attached. Generally, a protection level provided by the current/voltage interruption capability of a circuit breaker apparatus is defined by an electronic trip unit (ETU), which is installed therein and which is a device that may control various operational aspects of the circuit breaker apparatus, such as a current versus time trip response.

The operational parameters of the ETU and the circuit breaker, which define the protection level of the circuit breaker and the trip response characteristics thereof, are set on the rating plugs of the ETU which may be factory set. That is, circuit boards of the rating plugs are physically cut for a particular circuit breaker apparatus configuration. Once this configuration is set, it usually cannot be conveniently changed in the field. If the operational parameters of the ETU and the circuit breaker apparatus need to be modified, then, the factory set rating plugs generally need to be replaced.

Some rating plugs, however, may be field-modified by an actuation of various switches found on-board the rating plugs. These field-modifiable rating plugs have multiple settings that can be set or reset by an operator thereof who would be responsible for mechanically manipulating the switches. Unfortunately, the operator in these cases must physically go to the breaker and manually change settings. Also, such operator modifications may additionally lead to a possibility of intermittent switch positions, which can cause a nuisance trip or an un-intended protection setting to be placed in effect.

BRIEF DESCRIPTION

In accordance with an aspect of the invention, a circuit breaker apparatus is provided and includes a trip mechanism which is coupled to an electrical circuit and which is configured to interrupt an operation of the electrical circuit when the trip mechanism is actuated, an electronic trip unit in signal communication with and configured to actuate the trip mechanism when pre-selected conditions are satisfied, and a rating plug coupled to the electronic trip unit and configured to operate in a first mode in response to a receipt of a transmitted control signal at the rating plug, and to otherwise operate in a second mode, the first and second modes being respectively associated with first and second ones of the pre-selected conditions to be correspondingly transmitted to the electronic trip unit by which the electronic trip unit determines whether to actuate the trip mechanism.

In accordance with another aspect of the invention, a circuit breaker apparatus is provided and includes a trip mechanism which is coupled to an electrical circuit and which is configured to interrupt an operation of the electrical circuit when the trip mechanism is actuated, an electronic trip unit in signal communication with and configured to actuate the trip mechanism when pre-selected conditions are satisfied, and a rating plug coupled to the electronic trip unit and configured to operate in one of a plurality of first modes in response to a receipt of a transmitted one of a plurality of corresponding control signals at the rating plug, and to otherwise operate in a second mode, the plurality of first modes and the second mode being respectively associated with a plurality of corresponding first ones of the pre-selected conditions and corresponding second ones of the pre-selected conditions to be correspondingly transmitted to the electronic trip unit by which the electronic trip unit determines whether to actuate the trip mechanism.

In accordance with yet another aspect of the invention, a method of operating a circuit breaker apparatus, including a trip mechanism, which is actuated by an electronic trip unit, and a rating plug having operational modes defining operational parameters of the trip mechanism, is provided and includes evaluating circuit breaking requirements of an operational environment of the circuit breaker apparatus, determining which of the operational modes of the rating plug provides circuit breaking characteristics appropriate for the circuit breaking requirements, and applying a control signal to the rating plug to thereby set the rating plug to operate in the one of the operational modes that provides the appropriate circuit breaking characteristics to be transmitted to the electronic trip unit for use in a determination, at the electronic trip unit, of whether to actuate the trip mechanism.

BRIEF DESCRIPTION OF THE DRAWINGS

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION

Figure 1:
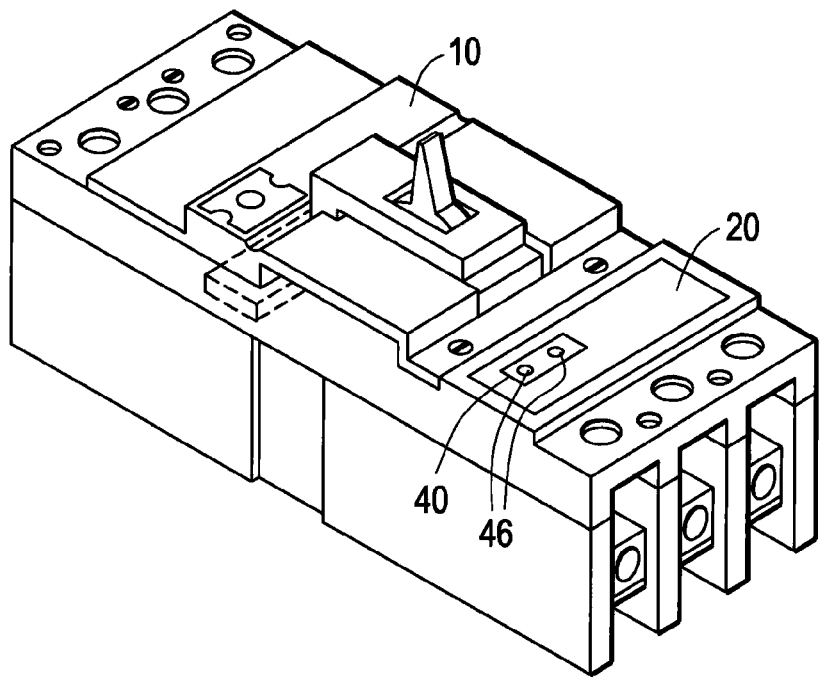
FIG. 1 is a perspective view of a circuit breaker apparatus having an exemplary rating plug installed thereon in accordance with an embodiment of the invention.
Figure 2:
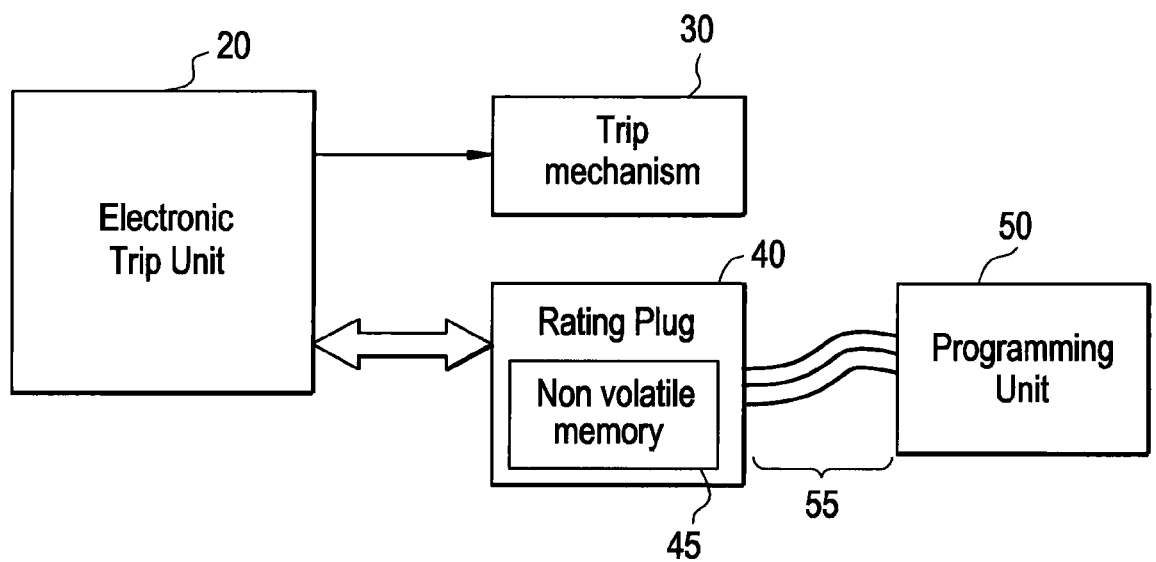
FIG. 2 is a schematic diagram of the circuit breaker apparatus of FIG. 1.

With reference to FIGS. 1 and 2, a circuit breaker apparatus 10 is provided and includes an electronic trip unit (ETU) 20 to control a current vs. time trip response of the circuit breaker apparatus 10 and an electromechanical trip mechanism 30, which is configured to interrupt an operation of a circuit to which the circuit breaker apparatus 10 and the trip mechanism 30 are coupled. In that capacity, the ETU 20 is configured to actuate the trip mechanism 30 when pre-selected conditions are satisfied. The pre-selected conditions refer to any operational conditions of the circuit, such as voltage or current spikes indicating arcing conditions, which are monitored by the ETU 20 and upon which a trip decision can be based to thereby prevent damages that could result from, e.g., a fire caused by an arcing condition.

As an example, a pre-selected condition could be the detection of any current within the circuit that exceeds 250 Amperes or 120 Volts as such current/voltage may be indicative of an arcing condition. In this case, if such a current or voltage were to be detected by the ETU 20, the ETU 20 would determine that a trip condition is met and subsequently actuate the trip mechanism 30 to interrupt the circuit on the basis of that determination. As a result, with the circuit interrupted, the arcing condition would be quenched and any damage that could result from the arc would be avoided.

A rating plug 40 is coupled to the electronic trip unit 20 and, where the circuit breaker apparatus 10 is to have a dual rating, is configured to operate in a first or a second mode. Each of the modes indicates to the ETU 20 different respective ones or more of the pre-selected conditions by which the ETU 20 determines that a trip condition is met. For example, the rating plug 40 could operate in the first mode and be configured to thereby indicate to the ETU 20 that a trip condition is met if a 250 A current is detected in the circuit. Concurrently, the same rating plug 40 could operate in the second mode and be configured to thereby indicate to the ETU 20 that a trip condition is met if a 100 A current is detect in the circuit. Thus, it may be seen that, in this example, the dual rating circuit breaker apparatus 10, including the rating plug 40, would have a high protection setting, which is characterized by the rating plug 40 operating in the first mode, and a low protection setting, which is characterized by the rating plug operating in the second mode.

The rating plug 40 could operate in further additional modes. In such a case, the rating plug 40 would be configured to indicate to the ETU 20 additional current levels at which trip conditions are met for each additional mode. Further, each of the modes could also indicate more than one pre-selected condition by which the ETU 20 determines that a trip condition is met. For example, in the first mode, as described above, the rating plug 40 could be configured to indicate to the ETU 20 that a trip condition is met if the detected current in the circuit exceeds 250 A and/or if the detected voltage in the circuit exceeds 120 volts.

The rating plug 40, as described above, may include a connector 60 and may operate in the first mode in accordance with a receipt, by the connector 60, of a control signal transmitted from a programming unit 50. That is, if the programming unit 50 currently transmits the control signal to the connector 60, the rating plug 40 will be configured to concurrently operate in the first mode, and, if the programming unit 50 does not currently transmit the control signal to the connector 60, the rating plug 40 will be configured to concurrently operate in the second mode.

In embodiments of the invention, the programming unit 50 currently transmits the control signal to the connector 60 if the programming unit 50 and the connector 60 are currently connected to one another. Conversely, in these embodiments, the programming unit 50 does not currently transmit the control signal to the connector 60 if no current connection is in effect. In alternative embodiments of the invention, the programming unit 50 includes on-board logic that dictates that the control signal is or is not to be currently transmitted to the connector 60 while a current connection between the programming unit 50 and the connector 60 is in effect. In this case, the programming unit 50 may include a programmable logic controller (PLC) or a dry contact (relay) output from a building automation system controller.

In accordance with further alternate embodiments of the invention, the rating plug 40 may operate in the first or the second mode in accordance with a receipt of first or second different control signals, respectively, which are each transmitted from the programming unit 50 by the connector 60. That is, if the programming unit 50 transmits the first control signal to the connector 60, the rating plug 40 will be configured to operate in the first mode. Conversely, if the programming unit 50 transmits the second control signal to the connector 60, the rating plug 40 will be configured to operate in the second mode.

Figure 3:
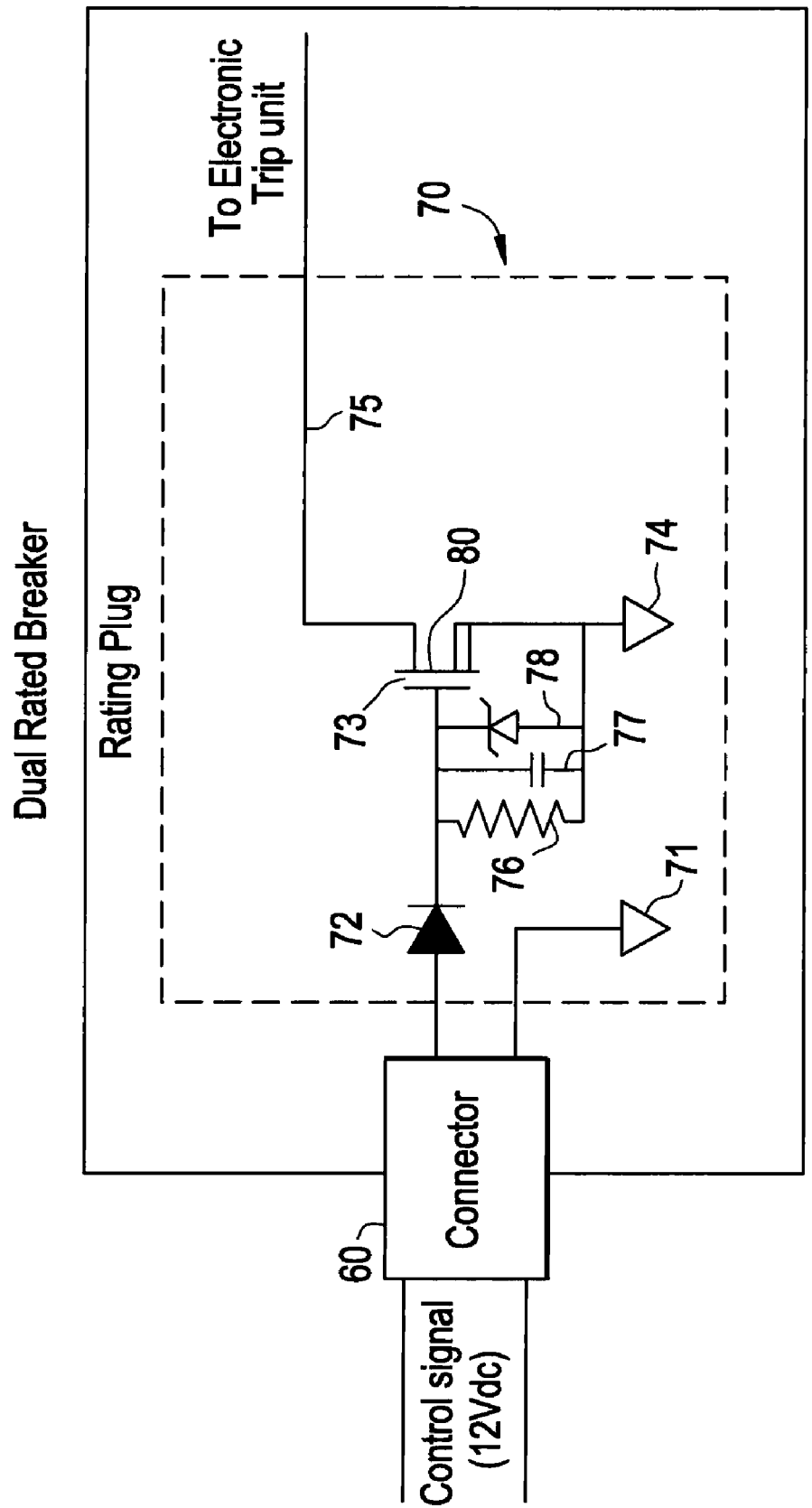
FIG. 3 is an illustration of an exemplary circuit diagram of the rating plug of FIG. 1.

With reference to FIG. 3, it is seen that the rating plug 40 includes the connector 60 which is configured to receive a control signal and a switching module 70. The switching module 70 is coupled to the connector 60 and includes a first signal path 75 that establishes the first mode of operation of the rating plug 40 when the control signal described above is received by the connector 60 as well as a second signal path 73 that establishes the second mode of operation of the rating plug 40 when the control signal described above is not received by the connector 60. In this way, the switching module 70 is configured to set the rating plug 40 to operate in the first or second mode in accordance with the control signal receiving state of the connector 60.

In an embodiment of the invention, the switching module 70 includes a first ground connection 71, which is coupled to the connector 60 and a first diode 72, which is arranged in parallel with the first ground connection 71 and which prevents current and voltage from propagating toward the connector 60. A switch 80 is disposed between the first diode 72 and a second ground connection 74. A resistor 76, which is configured to dissipate electric potential within the switching module 70, a capacitor 77, which is configured to store electric potential in the switching module 70, and a second diode 78, such as a Zener diode or some other suitable type of diode, which is configured to prevent the flow of current with all but a particular voltage to the switch 80, are arranged in parallel with the switch 80.

The switch 80 may be an electronic switch, such as a metal-oxide-semiconductor field-effect transistor (MOSFET), a bi-polar transistor, silicon controlled rectifier (SCR), or some other suitable type of transistor. The switch 80 may be opened and/or closed by an application of a pre-selected voltage provided by the received control signal. As an example, where the received control signal is a 12 volt direct current signal, the second diode 78 may admit a current signal of 5 volts to the switch 80. At this point, the switch 80 automatically closes to form the first signal path 75 that establishes the first mode of operation of the rating plug 40. In this condition, the pre-selected conditions of the first mode are subsequently transmitted to the ETU 20. Since the switch 80 may be configured to close only upon the admission of the 5 volt current resulting from the 12 volt direct current signal, it follows that the switch 80 is otherwise open forming the second signal path 73 that establishes the second mode of operation of the rating plug 40. Thus, it may be seen that the first mode of the rating plug 40 can be set when the switch 80 is open and that the second mode of the rating plug 40 can be set when the switch 80 is closed.

In accordance with embodiments of the invention, the switching module 60 may include a plurality of switches 80 that cooperatively open and/or close and which thereby enable the switching module 60 to form n-bits of information to be transmitted to the ETU 20, where n equals the number of the switches 80 within the switching module 60 and the n-bits of the information describe various pre-selected conditions by which the ETU 20 makes a trip decision. In this case, if the switching module 60 contains 4 switches 80, the rating plug 40 could send 4-bits of information to the ETU 20. In accordance with still further embodiments of the invention, the switching module 60 may be plural in number with each of the plurality of the switching modules 60 respectively including its own plurality of switches 80.

Further, where the switching module 60 includes, e.g., four switches 80, the switching module 60 may be configured to respond to various voltage levels within the control signal as received by the connector 60 to produce an equal number of bit information combinations. In this case, if the control signal is received at 100% long term pick up (LTPU) capacity, the switching module 60 may output a pre-selected 4 bit code to the ETU 20 whereas, if the control signal is received at 50%

LTPU, the switching module 60 may output a different preselected 4 bit code to the ETU 20. Here, the 100% 4 bit code would indicate a certain set of trip conditions while the 50% 4 bit code would indicate a different set of trip conditions.

The rating plug 40 may include a storage unit 45, such as a non-volatile memory. Such a storage unit 40 stores data describing the first and second ones of the pre-selected conditions to be accessed upon the receipt of the control signal. That is, when the switch 80 closes as described above, the storage unit 45 may be accessed for detail regarding, e.g., the second mode of the rating plug 40, which can then be transmitted to the ETU 20. The use of the non-volatile memory insures that settings of the rating plug 40 will be retained even in case of a power failure and/or a power cycling operation.

In accordance with various embodiments, the rating plug 40 and the programming unit 50 may be selectively coupled to one another via a wired or a wireless connection. Where they are wired to one another, the rating plug 40 may include a jack 46 to which wiring 55 of the programming unit 50 is connected. Where the rating plug 40 and the programming unit 50 are wirelessly connected to one another, each may include a respective set of transmitters and receivers that are configured to communicate over radio frequencies (RF), infrared (IR) frequencies, Bluetooth networks, wide area networks (WAN) and/or any other suitable systems.

In accordance with another aspect of the invention, a circuit breaker apparatus 10 is provided that includes a trip mechanism 30 which is coupled to an external circuit and which is configured to electromechanically interrupt an operation of the circuit when the trip mechanism 30 is actuated, an electronic trip unit 20 in signal communication with and configured to actuate the trip mechanism 30 when pre-selected conditions are satisfied, a rating plug 40 coupled to the electronic trip unit 20 and a programming unit 50. The rating plug 40 is configured to operate in one of a plurality of first modes in response to a receipt of one of a plurality of corresponding control signals at the rating plug 40, and to otherwise operate in a second mode. Here, the plurality of first modes and the second mode are respectively associated with a plurality of corresponding first ones of the pre-selected conditions and corresponding second ones of the pre-selected conditions. The programming unit 50 is configured to transmit each of the corresponding control signals to the rating plug 40 such that the rating plug 40 operates in the one of the plurality of the first modes when the programming unit is in signal communication with the rating plug 40.

In accordance with yet another aspect of the invention, a method of operating a circuit breaker apparatus 10, including a trip mechanism 30, which is actuated by an electronic trip unit (ETU) 20, and a rating plug 40 having operational modes defining operational parameters of the trip mechanism 30, is provided. The method includes evaluating circuit breaking requirements of an operational environment of the circuit breaker apparatus 10, determining which of the operational modes of the rating plug 40 provides circuit breaking characteristics appropriate for the circuit breaking requirements, and applying a control signal to the rating plug 40 to thereby set the rating plug 40 to operate in the one of the operational modes that provides the appropriate circuit breaking characteristics to be transmitted to the electronic trip unit for use in a determination, at the electronic trip unit, of whether to actuate the trip mechanism. Here, the applying may include transmitting the control signal to the rating plug 40 via a wired and/or wireless connection.

As described above, the rating plug 40 provides an on-site operator with the flexibility to configure or reconfigure the rating plug 40 as necessary using a wired and/or a digital programmer/remote altering system. The rating plug 40 also makes it possible for the manufacturer to change the configuration thereof remotely. In addition, even where the rating plug 40 is reconfigured by the operator, the rating plug 40 present little or no risk of a switch being in an intermittent position and, thus, eliminates the risk of an un-intended setting being laced in effect.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof Therefore, it is intended that the disclosure not be limited to the particular exemplary embodiment disclosed as the best mode contemplated for carrying out this disclosure, but that the disclosure will include all embodiments falling within the scope of the appended claims.

The invention claimed is:

1. A circuit breaker apparatus, comprising:
a trip mechanism which is coupled to an electrical circuit and which is configured to interrupt an operation of the electrical circuit when the trip mechanism is actuated;
an electronic trip unit disposed in signal communication with and configured to actuate the trip mechanism when pre-selected conditions are satisfied;
a rating plug coupled to the electronic trip unit and configured to operate in a first mode in response to a receipt of one or more transmitted control signals at the rating plug, and to otherwise operate in a second mode, the first and second modes being respectively associated with first and second ones of the pre-selected conditions to be correspondingly transmitted to the electronic trip unit by which the electronic trip unit determines whether to actuate the trip mechanism; and
a programming unit which is configured to transmit each of the one or more control signals to the rating plug such that the rating plug operates in the first mode when the programming unit is disposed in signal communication with the rating plug.

2. The circuit breaker apparatus according to claim 1, wherein the rating plug comprises a connector by which the programming unit communicates with the rating plug and which receives the one or more control signals.

3. The circuit breaker apparatus according to claim 1, wherein the rating plug comprises a switching module including a first signal path that establishes the first mode of operation of the rating plug, and a second signal path that establishes the second mode of operation of the rating plug.

4. The circuit breaker apparatus according to claim 3, wherein the switching module comprises a switch, which closes to form the first signal path upon an application of a pre-selected voltage provided by the received control signal, and which otherwise opens to form the second signal path.

5. The circuit breaker apparatus according to claim 1, wherein the rating plug comprises a storage unit which is configured to store data describing the first and second ones of the pre-selected conditions to be accessed when the rating plug operates in the first or second mode.

6. The circuit breaker apparatus according to claim 1, wherein the rating plug and the programming unit are configured to communicate via a wired connection.

7. The circuit breaker apparatus according to claim 1, wherein the rating plug comprises a jack to which the programming unit is configured to connect with.

8. The circuit breaker apparatus according to claim 1, wherein the rating plug and the programming unit are each configured to communicate via a wireless connection.

9. The circuit breaker apparatus according to claim 1, wherein the programming unit comprises a programmable logic controller which is configured to actuate the transmission of the one or more control signals.

10. The circuit breaker apparatus according to claim 1, wherein the programming unit comprises a dry contact which is configured to actuate the transmission of the one or more control signals.

11. A circuit breaker apparatus, comprising:
- a trip mechanism which is coupled to an electrical circuit and which is configured to interrupt an operation of the electrical circuit when the trip mechanism is actuated;
- an electronic trip unit in signal communication with and configured to actuate the trip mechanism when pre-selected conditions are satisfied;
- a rating plug coupled to the electronic trip unit and configured to operate in one of a plurality of first modes in response to a receipt of a transmitted one of a plurality of corresponding control signals at the rating plug, and to otherwise operate in a second mode, the plurality of first modes and the second mode being respectively associated with a plurality of corresponding first ones of the pre-selected conditions and corresponding second ones of the pre-selected conditions to be correspondingly transmitted to the electronic trip unit by which the electronic trip unit determines whether to actuate the trip mechanism; and
- a programming unit which is configured to transmit each of the corresponding control signals to the rating plug such that the rating plug operates in the one of the plurality of the first modes when the programming unit is in signal communication with the rating plug.

12. A method of operating a circuit breaker apparatus, including a trip mechanism, which is actuated by an electronic trip unit, and a rating plug having operational modes defining operational parameters of the trip mechanism, the method comprising:
- evaluating circuit breaking requirements of an operational environment of the circuit breaker apparatus;
- determining which of the operational modes of the rating plug provides circuit breaking characteristics appropriate for the circuit breaking requirements; and
- applying one or more control signals from a programming unit to the rating plug by disposing the programming unit in signal communication with the rating plug to thereby set the rating plug to operate in the one of the operational modes that provides the appropriate circuit breaking characteristics to be transmitted to the electronic trip unit for use in a determination, at the electronic trip unit, of whether to actuate the trip mechanism.

13. The method according to claim 12, wherein the applying comprises transmitting the one or more control signals to the rating plug via a wired connection.

14. The method according to claim 12, wherein the applying comprises wirelessly transmitting the one or more control signals to the rating plug.

* * * * *